(12) United States Patent
Lagar Cavilla et al.

(10) Patent No.: US 9,501,224 B2
(45) Date of Patent: Nov. 22, 2016

(54) METHOD AND SYSTEM FOR MEMORY OVERSUBSCRIPTION FOR VIRTUAL MACHINES

(71) Applicant: GOOGLE INC., Mountain View, CA (US)

(72) Inventors: Horacio Andres Lagar Cavilla, East Toronto (CA); Adin Matthew Scannell, Toronto (CA); Timothy James Smith, W. Toronto (CA); Peter Feiner, Toronto (CA); Mushfiq Mahmood, Scarborough (CA); David Richard Scannell, Toronto (CA); Jing Chih Su, Toronto (CA)

(73) Assignee: Goolge Inc., Mountain View, CA (US)

( * ) Notice: Subject to any disclaimer, the term of this patent is extended or adjusted under 35 U.S.C. 154(b) by 0 days.

(21) Appl. No.: 14/390,249

(22) PCT Filed: Apr. 3, 2013

(86) PCT No.: PCT/CA2013/050269
§ 371 (c)(1),
(2) Date: Oct. 2, 2014

(87) PCT Pub. No.: WO2013/149343
PCT Pub. Date: Oct. 10, 2013

(65) Prior Publication Data
US 2015/0058580 A1    Feb. 26, 2015

Related U.S. Application Data

(60) Provisional application No. 61/619,761, filed on Apr. 3, 2012.

(51) Int. Cl.
G06F 12/00 (2006.01)
G06F 3/06 (2006.01)
G06F 9/455 (2006.01)

(52) U.S. Cl.
CPC ........... *G06F 3/0604* (2013.01); *G06F 3/0662* (2013.01); *G06F 3/0673* (2013.01); *G06F 9/45533* (2013.01); *G06F 9/45558* (2013.01); *G06F 2009/45583* (2013.01)

(58) Field of Classification Search
CPC .. G06F 3/0604; G06F 3/0673; G06F 3/0662; G06F 9/45533; G06F 9/45558; G06F 2009/45583
See application file for complete search history.

(56) References Cited

U.S. PATENT DOCUMENTS

| | | | |
|---|---|---|---|
| 6,789,156 B1 | 9/2004 | Waldspurger | |
| 7,577,722 B1 | 8/2009 | Khandekar et al. | |
| 2009/0070776 A1 | 3/2009 | Dahlstedt | |
| 2010/0169536 A1* | 7/2010 | Shedel et al. | 711/6 |
| 2012/0030407 A1 | 2/2012 | Pandey et al. | |

* cited by examiner

Primary Examiner — David X Yi
Assistant Examiner — Alan Otto
(74) Attorney, Agent, or Firm — Lerner, David, Littenberg, Krumholz & Mentlik, LLP (57) ABSTRACT

A method for oversubscribing a host memory of a host running a virtual machine monitor (VMM), comprising, examining a virtual machine (VM) memory for a VM for metadata associated with the VM memory, the metadata maintained by a guest OS running on the VM, collecting the metadata for the VM memory, and managing the VM memory using the metadata for oversubscribing a host memory.

20 Claims, 6 Drawing Sheets

METHOD AND SYSTEM FOR MEMORY OVERSUBSCRIPTION FOR VIRTUAL MACHINES

CROSS REFERENCE TO RELATED APPLICATIONS

This application is the National Phase of PCT International Application No. PCT/CA2013/050269, filed on Apr. 3, 2013, which claims priority under 35 U.S.C. 119(e) to U.S. Provisional Application No. 61/619,761, filed on Apr. 3, 2012, all of which are hereby expressly incorporated by reference into the present application.

FIELD

The field is generally memory management for virtual machines and virtual machine monitors.

BACKGROUND

System virtual machines (VM) are capable of virtualizing a full set of hardware resources, including a processor or processors, memory, storage resources, and peripheral devices. A virtual machine monitor (VMM) or hypervisor may be software and/or hardware that manages one or more virtual machines.

VMs may be used to run more than one instance of an operating system and application software stack on a single physical machine, where the VM and physical machine share a common hardware architecture. This use of VMs is driven by the desire to consolidate many less-capable physical machines onto a single more-capable physical machine, generally to reduce operational costs by multiplexing more virtual resources than there are physical resources, this is known as oversubscription.

For example, a physical machine containing a single physical CPU may host several VMs, each of which may be allocated a virtual CPU. The clock cycles of the physical CPU, during which the CPU executes some number of instructions, are divided between the virtual CPUs such that the sum of all clock cycles consumed by the set of virtual CPUs is less than or equal to the clock cycle rate of the physical CPU. Over-subscription of network interfaces is similar in that the sum of network frames sent and received by the set of all virtual interfaces is less than or equal to the frame rate of the physical interface.

CPUs and network interfaces share the characteristic of being temporally divisible, i.e. a CPU has an operating frequency, during which a fixed number of instructions can be executed during a unit of time, and a network interface has a transmission rate, during which a fixed number of frames may be sent and received during a unit of time. Multiplexing devices that have this characteristic is simply a matter of dividing up the time slices of the physical device among one or more virtual devices, and over-subscription is achieved through having more than one virtual device per physical device.

Random Access Memory (RAM) may be multiplexed or oversubscribed but in a different manner than CPUs or network interfaces. Generally, it is more difficult to multiplex RAM since it is shared between different consumers along a spatial dimension.

An example of a known memory management technique involves moving VM data out of RAM to some other form of storage, and then bringing the data back into RAM when it is required by the VM. Another example of a known virtual machine memory management technique is "ballooning". Generally, a virtual machine manager running on a host machine can request that a guest VM increase ("inflate") or reduce ("deflate") its memory footprint. The guest VM can choose to accept or ignore this request. The host machine, in contrast, has no direct control over the memory usage of the guest virtual machine other than to request that it inflate or deflate its memory footprint.

SUMMARY

An object of the present methods and systems are to provide memory oversubscription for virtual machines and/or cloned virtual machines.

In an aspect, a virtual machine monitor (VMM) on a host machine manages the memory of one or more VMs running corresponding guest OSs. In an embodiment, the host machine is able to manage the memory of the one or more guest virtual machines without the participation or knowledge of the one or more guest OSs.

The prior art may treat a guest OS running on a clone VM as a black box where the VMM does not look inside of the guest OS kernel for information. For example, prior art solutions such as "ballooning", as was previously described, request that a guest VM to increase or reduce its memory footprint. However, the guest VM is free to ignore this request or to take an arbitrary amount of time to satisfy the request. In contrast, the methods and systems provided herein allow for a VMM to manage the memory of a guest VM without the participation or knowledge of the guest VM. The timing is also controlled by the methods and systems.

In another aspect, Virtual Memory Streaming comprises scanning or introspecting memory of the guest OS for collecting metadata and modifying the memory of a guest OS running on a VM. In an embodiment, a method for introspection is provided, which may inspect and modify the memory and/or memory contents of a guest OS. Introspection may comprise profiling the memory of a guest OS running on a VM or a clone VM to identify, among other things, the metadata associated with a memory page, the contents of a memory page, and/or the location of specific identifying information such as operating system identifiers, domain authentication identifiers, and network identifiers. This information may be used for, in various aspects and embodiments, improving the live cloning of virtual machines, identifying the guest OS running on the VM, altering identifiers of the guest OS running on the VM, and allowing for memory oversubscription of the physical memory of the server hosting the VM that the guest OS is running on.

In an embodiment, introspecting or examining the memory of the kernel of the guest OS running on the VM enables the gathering of metadata by walking and building the physical frame number (PFN) database created and stored in the kernel. In another embodiment, introspecting or examining the memory of the kernel of the guest OS running on the VM for deriving metadata regarding PFNs by searching and identifying PFNs located in special regions of the kernel.

In another aspect, Virtual Memory Streaming provides for tracking the memory accesses for specific memory pages of the VM and using that information to manage the memory of the VM.

In another aspect, Virtual Memory Streaming provides for the cloning of an originating virtual machine that is live or running. In an embodiment, the guest OS may be paused before the cloning operation. In another embodiment, live cloning overcomes the limitation of having to clone an originating VM that is shutdown or not running, or the limitation of rebooting the guest OS. In another embodiment, a VM where the guest OS are MICROSOFT WINDOWS based operating systems may be live cloned.

In another aspect, memory oversubscription of the physical memory of the server running one or more cloned VMs is provided. In various aspects and embodiments, this may be done by combining multiple techniques or methods for gathering information on the memory of the cloned VM, for gathering metadata on the memory of the cloned VM, for managing the memory of the cloned VM, and for deciding how much of the memory of the VM is initially allocated on the physical server upon cloning and running the cloned VM.

In another aspect, Virtual Memory Streaming may enable the memory oversubscription of host memory by relying upon the a priori knowledge that the VMs are cloned from the same snapshot or originating VM with the same initial memory state. Since it is already known that the VMs are cloned from the same originating VM, no content fingerprinting of the memory or memory pages is required. Thus, one or more guest OS or clone VM memory pages may be mapped or shared as a single host memory page. The shared page will have identical contents, and no comparison of the contents of the memory page is required for determining if the page can be shared. For example, in an embodiment, a physical memory page containing static operating system kernel data may be mapped to the guest VM memory page of several cloned guest VMs, thereby negating the need for each guest virtual machine to have a physical memory page allocated for the same data.

In another aspect, identifying the guest OS running on the VM can be accomplished by introspecting or examining the values of specific memory locations of the kernel of the guest OS and comparing them to known values in order to identify the specific type of guest OS running.

In another aspect, cloning a live or running VM can be performed by replacing identifiers in the memory of the guest OS running on the VM. In an embodiment, this is done by first identifying the type of guest OS running. Then, changing identifiers of the guest OS to a sentinel value, and introspecting or examining the memory of the guest OS to identify and track the locations where the sentinel value or values derived from the sentinel value are found in the memory. The sentinel value may then be replaced with a new identifier by directly modifying the memory location where the sentinel value is located upon cloning the VM. In another embodiment, further cooperation with a guest agent running on the guest OS may be done to ensure that remaining unchanged identifiers are updated with the new identifier value or a value derived from the new identifier value within the kernel or memory of the guest OS. For example, in an embodiment, the guest agent resets and reconfigures the guest OS's networking subsystem. This overcomes the limitation that certain types of guest OSes could not be cloned while live or running and function correctly within a managed network or environment that otherwise supports the type of guest OS running on the cloned VM.

In another aspect, Virtual Memory Streaming can stream memory pages to a cloned VM. Virtual Memory Streaming is enabled to work with the snapshot VM image provided as a file or other computer data storage or memory. In an embodiment, this may overcome the limitation of having any type of server, server bottle-neck, or single point of failure.

In another aspect, Virtual Memory Streaming enables memory oversubscription for virtual desktop interface (VDI) or cloud infrastructure servers.

DETAILED DESCRIPTION

Definitions

Virtual Machine

A virtual machine (VM) may be defined as, an instance of an operating system, system software, and application software stack that executes in a virtualized environment. That is, instead of executing its software stack directly on physical hardware, i.e. CPU(s), memory, and I/O devices such as disk storage and network interfaces, the VM executes within a virtual hardware environment which is abstracted from the physical hardware.

The term virtual machine (VM) may also mean a software container that holds a complete operating environment comparable to that provided by a complete physical computer or host, the operating environment may include an operating system, system libraries and application stack.

Virtual Machine or hardware virtual machine may also be defined as the software representation of hardware comprising memory, cpu state, device state, and disk state. There may also be hardware that supports virtualization or the execution of virtual machines. An operating system may be part of the software comprising a virtual machine, but it is not required.

Cloned Virtual Machine

A cloned VM is an identical copy of an existing originating VM. In an embodiment, a snapshot of a live, running, existing originating VM is taken as the golden image for cloned VMs. The originating VM may be paused before the snapshot is taken. Multiple VMs can be started from this snapshot of the basis image. All such VMs are called clones and are identical in all aspects of their virtual or pseudo-physical architecture to the originating VM. This includes the contents of the registers of the virtual CPUs, the contents of the registers of the virtual IO devices, the contents of the one or more local virtual disks attached to the VM, and the contents of the RAM assigned to the VM.

In another embodiment, a cloned virtual machine may be a copy of another virtual machine, where a virtual machine is represented by its memory contents stored in computer data storage or memory, e.g. a file or RAM.

A state replica can be considered a running clone VM based on a snapshot.

Virtual Machine Monitor (VMM)

A virtual machine monitor (VMM), also known as a hypervisor, creates and runs virtual machines. A computer on which a VMM is running one or more virtual machines is known as a host machine. Virtual machines running on the host machine are known as guest machines.

Type I VMMs, or hypervisor-based VMMs, run directly on the host's hardware. An example of a Type I VMM is XEN. Type II VMMs, or hosted VMMs, run within a conventional operating system environment. Examples of a Type II VMM are VIRTUALBOX and KVM.

Host Machine Memory

Host machine memory is the physical memory of the computer on which a VMM is running.

Virtual Address

In traditional OS terminology, a translation method is employed by the hardware when accessing memory, which is called virtual memory. Programs, including the OS, refer to memory with addresses called "virtual addresses". A data structure called a page table is used to translate, or map, from a virtual address to a physical address. Generally, a virtual memory page maps to a physical memory frame. Some architectures may overlay additional translation in the form of segmentation, i.e. adding base offsets to and/or checking bounds of the translation. Some architectures may perform the translation automatically in hardware by "walking" the page tables.

Guest Frame Numbers/Page Frame Numbers

In a virtualized environment, an additional or secondary translation is performed from the physical address as understood by the VM, or pseudo-physical address, to the real physical address of memory in the host, or machine address. This translation also uses a page table-like data structure. Frames of guest pseudo-physical memory are identified by Guest Frame Numbers (GFNs) while frames of machine real-physical memory are identified with Page Frame Numbers (PFNs). A skilled person would understand that the guest OS executing inside the VM still believes it is managing PFNs, and that the GFN/PFN distinction is only relevant in the context of the host virtualization software, e.g. VMM or hypervisors.

Cloud Computing Infrastructure

In a cloud infrastructure environment, physical computers host VM instances generally operating in the capacity of a network server. These VM instances may be geographically centralized or distributed, depending on the infrastructure and user needs, but are always accessed via a network or the Internet. The VMs may belong to a single person or organization, e.g. single tenant infrastructure, or may be shared by multiple people or organizations, e.g. multi tenant infrastructure. Additionally, most cloud infrastructure operators expose an application programmer interface (API) for users to create and terminate VM instances.

Desktop Virtualization

Conceptually, desktop virtualization separates a personal computer desktop environment from a physical machine using the client-server model of computing. Virtual Desktop Infrastructure (VDI) is the server computing model that enables desktop virtualization and encompasses both the hardware and software systems required to support the virtualized environment.

The desktop virtualization model allows for the use of virtual machines to let multiple users maintain desktops on a centrally located computer or server. The server may operate in a data center. The users may be geographically separated but must be connected to the server by a network or the Internet. Example VDI modes of operation are hosted virtual desktops or centralized virtual desktops. Centralized virtual desktops may run in static or dynamic mode. In static mode, a unique desktop VM is persistently bound to a single user. In dynamic mode, a pool of generic desktop VMs are dynamically assigned to users as they log in; the user-specific data and settings are applied to the dynamically assigned VM through the use of profile management tools.

Cloning of Virtual Machines

It is possible to make an independently functioning copy of an existing virtual machine by copying or "cloning" it. Some known techniques for cloning of virtual machines are described in, for example, Horacio Andres Lagar Cavilla, et al., "SnowFlock: rapid virtual machine cloning for cloud computing", In EuroSys '09: Proceedings of the 4th ACM European conference on Computer Systems (2009), p. 1-12.

Live cloning refers to cloning an existing virtual machine while the existing virtual machine (i.e., the virtual machine being copied) is still active. In some cases the existing virtual machine may need to be paused before a clone can be made. In other circumstances, the clone may be created while the virtual machine is running, or in some state other than paused.

Identity of Operating Systems

Many modern networked operating systems, may have one or more machine-readable unique network identifiers, e.g. an IP address, and may have one or more unique machine identifiers, e.g. a hostname, machine name or computer name. The machine and network identifiers may or may not be human readable.

These machine identifiers serve to facilitate the access and management of a respective operating system instance, i.e. an installation of the operating system on a computer or VM, by human operators.

In some cases the network identifiers are assigned by a human operator, e.g. a "static" IP address, and in other cases the network identifiers are assigned by a computer system, e.g. Dynamic Host Configuration Protocol or DHCP. In some cases a machine identifier may directly or indirectly be assigned by a human operator, or at least the basis for the identifier, e.g. myhost-### where ### is filled in by a computer system as in myhost-001, myhost-002, etc.

In some cases the network identifier may change one or more times while the operating system instance is running, i.e. has remained on continuously since being "booted", or powered on, and a DHCP lease has been renewed.

Some modern operating systems, e.g. variants of MICROSOFT WINDOWS, generally do not allow some machine identifiers to be changed while the operating system instance is running, therefore in order to effect a change in the human-readable machine identifier the operating system instance must be shut down and powered on again, i.e. rebooted.

Description

Memory oversubscription is directed towards managing the memory of guest virtual machines running on a host machine. In one aspect, memory oversubscription provides host machine functionality that is directed towards reducing the memory footprint of one or more guest virtual machines running on the host machine. In an embodiment, this may comprise causing guest virtual machines to share common memory pages. In another embodiment, this may comprise deallocating PFNs mapped to under or unutilized GFNs. In another embodiment, memory oversubscription functionality can assist in the cloning of guest virtual machines. In another embodiment, memory oversubscription can be used to assist in virtual desktop infrastructure (VDI) environment.

Generally, some functions associated with memory oversubscription require that the host machine is able to access and manipulate the virtual machine's memory without intervention from the guest Operating System (OS) running inside the virtual machine. In an embodiment, introspection is used to access and manipulate the virtual machine's memory. A skilled person would understand that alternate means for accessing and manipulating a virtual machine's memory could be used without departing from the scope of this disclosure.

A skilled person would understand that a host machine could be any physical or virtual computer configured to act as a server. In an example embodiment, a host machine could be a physical server running one virtual machine managers supporting one or more virtual machines. In another example embodiment, the host machine could be virtual machine that itself is running a virtual machine manager that supports its own virtual machines.

Overview of System Embodiments

Figure 4A:
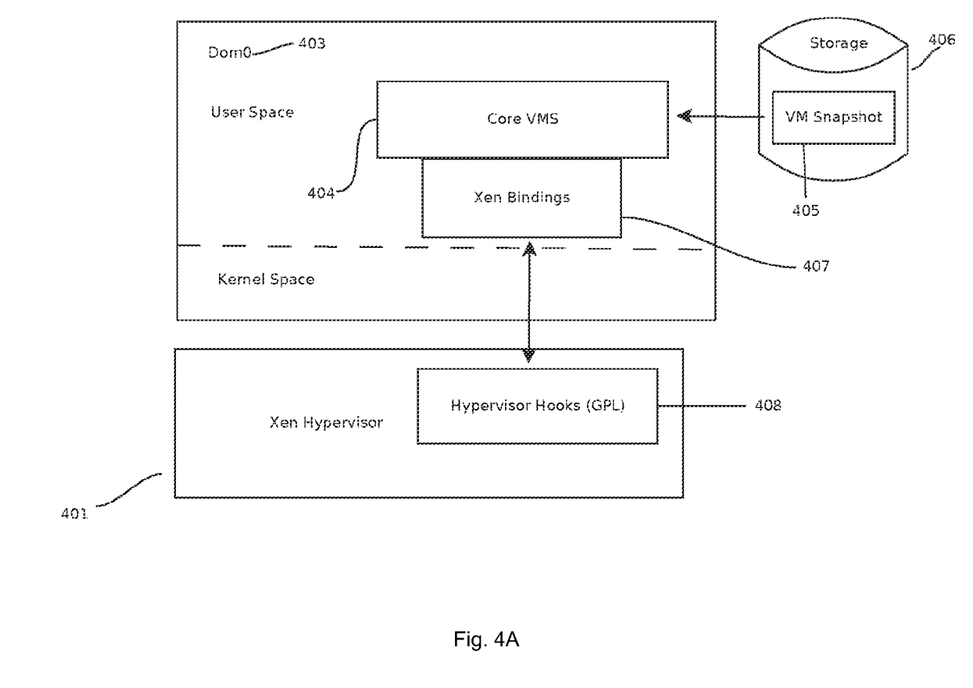
FIG. 4A is a XEN type system diagram of an embodiment of the system for memory oversubscription for cloned virtual machines.

An example embodiment system, as depicted in FIG. 4a, is implemented within the framework of the XEN VMM. XEN is a hypervisor-based VMM, also known as "Type I". A thin layer of software called the hypervisor 401 executes directly on top of the hardware, with the highest level of privilege. This component is labeled "Xen Hypervisor" 401 in FIG. 4a. The hypervisor multiplexes VMs 402 or domains on the hardware. Specialized domains perform management tasks on behalf of the VMM. One such specialized domain is known as "domain zero", and is labeled "dom0" 403 in FIG. 4a. The dom0 403 VM typically executes a Linux kernel, a complete Linux distribution, and XEN-specific management software.

The embodiments described below, including but not limited to the mechanisms for performing introspection on the guest OS running inside the VM, the mechanisms for finding and modifying sentinel values in the VMs memory to implement reconfiguration of the IDs associated to the VM, the mechanisms for sharing pages or memory pages in order to realize memory oversubscription, the mechanisms for finding pages or memory pages that can be temporarily removed from the VMs memory to perform introspection, etc., are all implemented by the component labeled "Core VMS" 404 in FIG. 4a. This component fetches VM memory state from a file labeled "VM Snapshot" 405 in FIG. 4a. This file is hosted by a storage fabric labeled "Storage" 406. The storage fabric could be a locally-attached storage disk, a Storage Area Network appliance, a Network Attached Storage appliance, a distributed file system, or other storage fabrics known to a skilled person.

The "Core VMS" component in FIG. 4a executes as a regular process in the user-space portion of the "Dom0" 403 management VM. It includes XEN-specific bindings (labeled "Xen Bindings" 407) to perform privileged operations on VM memory and state. This bindings use specific entry points into the hypervisor, labeled "Hypervisor Hooks" 408 in FIG. 4a, to carry out the necessary tasks.

These "Core VMS" 404 are the implementations of the memory oversubscription functionality described above. For instance, the "Core VMS" 404 may include the ability to introspect memory to detect and deallocate unused guest virtual machine memory pages.

In an embodiment, the VM may include a "Guest Agent" component. The guest agent component collaborates in the ID reconfiguration mechanism by, for example, reconfiguring the IP address of a VM network interface. In some example embodiments this may be a service running in the guest VM that is configured to reconfigure the ID upon request by the host.

Figure 4B:
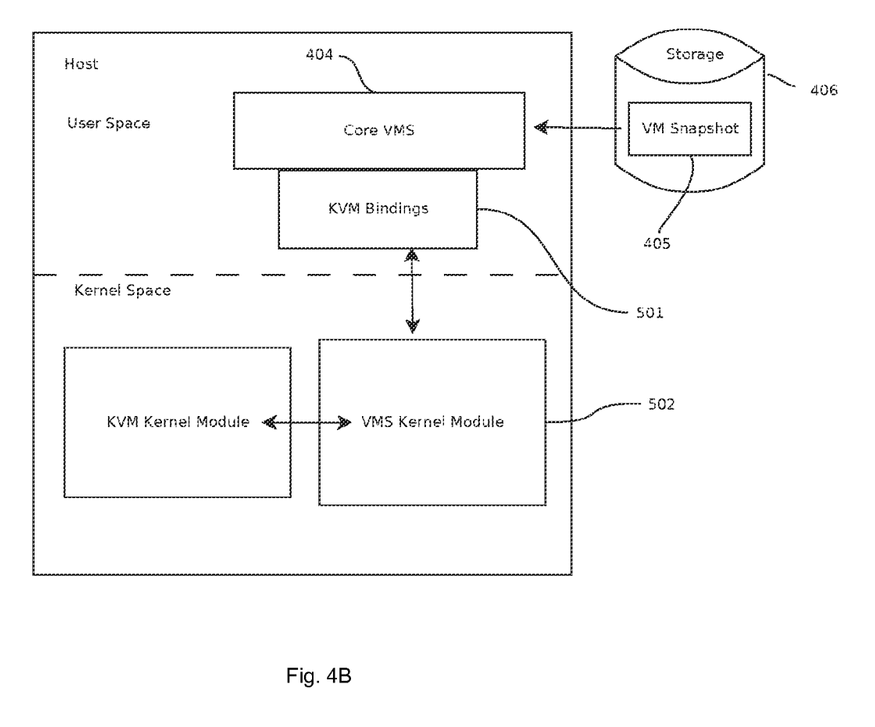
FIG. 4B is a Kernel Based Virtual Machine (KVM) type system diagram of an embodiment of the system for memory oversubscription for cloned virtual machines.

In another example embodiment system, as depicted in FIG. 4b, is implemented within the framework of the Kernel Virtual Machine (KVM) VMM. KVM is a hosted (or "Type II") VMM. The VMM software executes as one more component in a hosting OS, labeled "Host" in FIG. 4b, in this case the Linux OS. The KVM kernel component is labeled "KVM Kernel Module" within the "Host" component.

Several components in FIG. 4b have the same meaning as their counterparts in FIG. 4a. These include the "VM Snapshot" 405 and "Storage" 406 components. Similar to the XEN VMM embodiment depicted in FIG. 4a, the "Core VMS" 404 component in the KVM embodiment depicted in FIG. 4b is a user-space software component executing within the host. This component implements the mechanisms described in the inventions below. The component relies on a number of bindings (labeled "KVM" bindings") 501 to invoke privileged kernel operations on its behalf. The bindings interact with entry points in the kernel in the component labeled "VMS Kernel Module" 502.

Introspection

Introspection, comprises scanning and manipulating the memory of a guest virtual machine. That is, introspection is the ability of the host to inspect the contents of the virtual or pseudo-physical architecture of the VMs it hosts, which is primarily but not limited to RAM. Scanning the memory of a guest virtual machine allows for the collection of, without limitation, memory usage data, memory page usage data, operating system information or metadata about the memory, and the contents of a guest virtual machine's memory. In an embodiment, the results of a memory scan can be stored in a datastore such as a file or a database. In another embodiment, the data may be summarized and stored as metadata.

In an embodiment, introspection allows a user or user application to understand how memory is being allocated and used by the one or more virtual machines running on the host. In another embodiment, introspection also allows a host user or host user application to manipulate the memory of the one or more virtual machines running on the host machine. Having an understanding of how guest virtual machines are utilizing memory allows user processes on the host machine to take advantage of this knowledge to manage host and guest resources. For example, an understanding of guest virtual machine memory usage may allow for the conservation of host machine memory by sharing physical memory frames common to cloned virtual machines, speeding up the virtual machine cloning process, and/or preventing network conflicts between newly cloned MICROSOFT WINDOWS based guest OSs running on guest virtual machines.

In an embodiment, introspection is used to collect as much useful information as possible on memory or memory page usage from the kernel of the guest OS running on the VM. One source of information is known as the PFN database. This is a database that maintains state information for each PFN the guest OS in the VM knows about. The information of the PFN database is not affected by any manipulations the virtualization software may perform to the VMs memory—these transformations remain unknown or transparent to the guest OS. Commodity operating systems in the MICROSOFT WINDOWS and Linux/Unix families maintain PFN databases.

While the PFN database may be explored to harvest useful metadata, it is not the only source of useful information from the guest OS. More information about memory or memory pages can be inferred by walking Virtual Address (VA) ranges and combining that information with PFN database information. In an embodiment, further information regarding guest virtual machine memory can be obtained by using the following:

a) The VA range associated with the PFN database is crawled and metadata associated with each page frame is extracted.

b) Specific VA ranges are crawled and for each range the set of page frame numbers that back the VAs in the range (or to whom those VAs translate to) are collected.

In an embodiment, these two sources of information are used to extract at least two pieces of information about each present guest frame: whether the frame is "allocated" or "used" within the guest; and, whether the frame belongs to special regions that should not be removed or unmapped from the VM. Special regions that should not be removed may be, for example, specific kernel data structures or code pages.

In another embodiment, publicly available documentation on the guest OS kernel is used to identify the regions of virtual memory in which critical data structures are hosted. These include, but are not limited to: the region of memory in which page-tables are stored; the region of memory in which the PFN database is stored; the region of memory in which the non-paged pool, such as in a Windows-based OS, is allocated; the region of memory in which the shared system page is allocated; and other memory or data structures that a skilled person would understand as critical to the guest OS kernel.

These important regions of memory are fixed for an operating system version. In an embodiment, multiple sets of numeric constants and string symbols whose presence unambiguously identifies various OSs are stored in order to introspect or handle multiple OSs, for example, MICROSOFT WINDOWS 7 and 8 guest OS versions may require two different sets of symbols. In another embodiment, an initial introspection or reading of the VMs memory is performed to find the symbols describing the guest OS. These symbols are stored at well known virtual addresses. If the symbols match those of a guest OS that the embodiment may handle, then processing of the regions of virtual memory of interest may begin at the corresponding virtual addresses for the identified guest OS.

In an embodiment, both finding the symbols that uniquely identify the OS version and processing ranges of virtual addresses containing information of interest require resolving translations from VAs to PFNs.

Figure 1A:
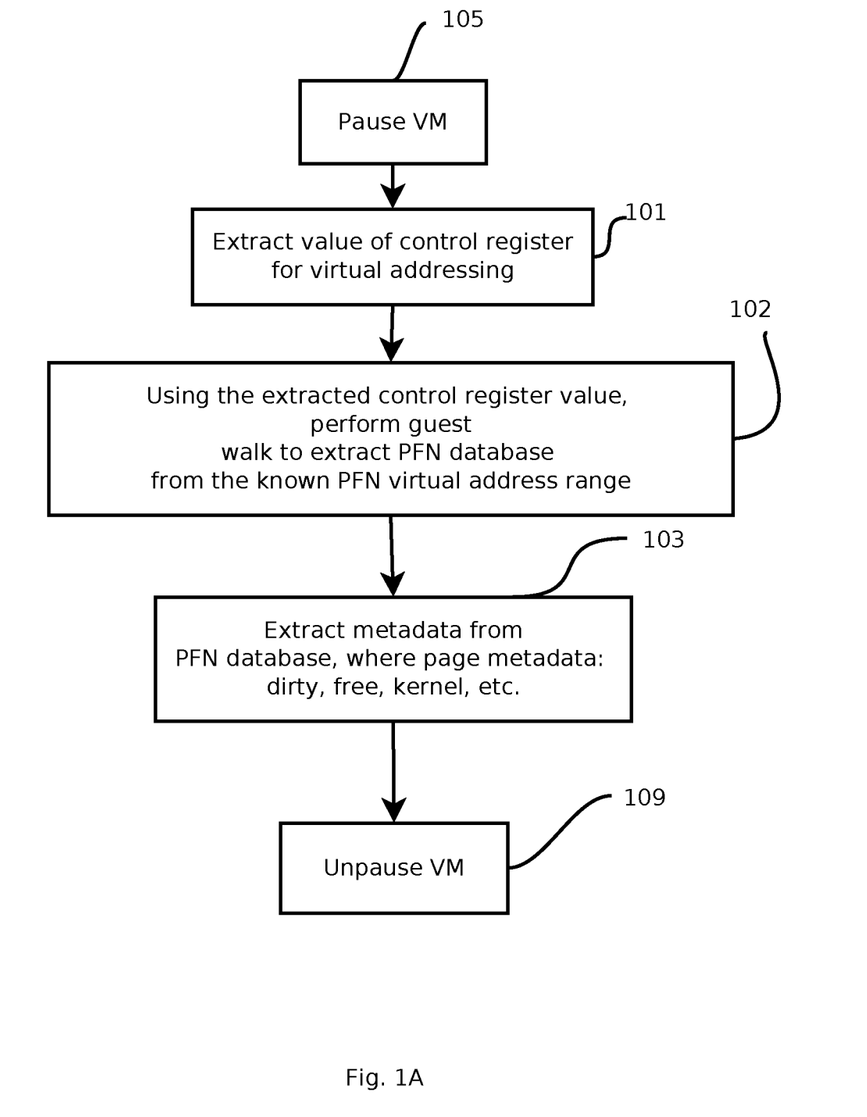
FIG. 1A is a block diagram of an embodiment of a procedure for introspection of the kernel of the PFN database of a guest operating system running on a virtual machine.
Figure 1B:
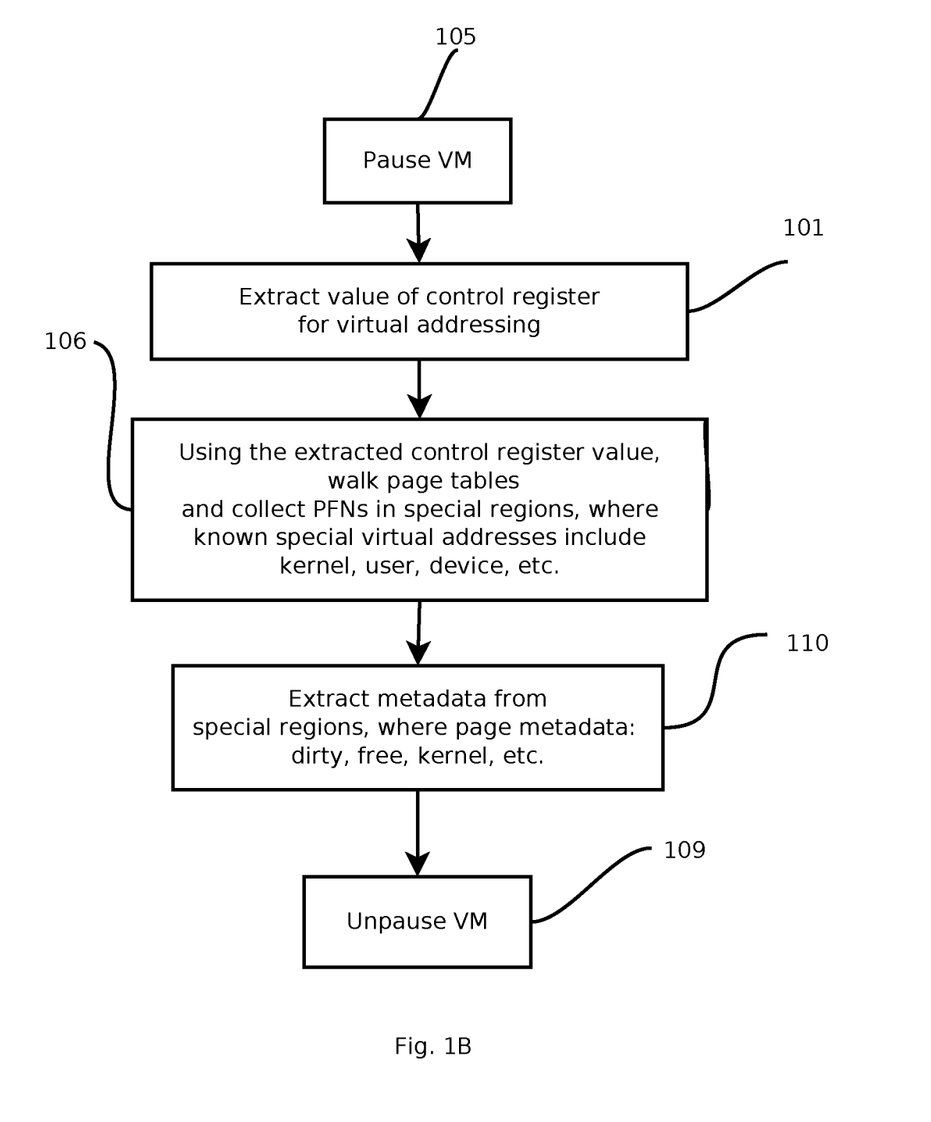
FIG. 1B is a block diagram of an embodiment of a procedure for introspection of the kernel of the special regions of a guest operating system running on a virtual machine.

An embodiment of Page Table Walking is described below, and, as illustrated in FIGS. 1A and 1B, are an example embodiment of how to translate VAs to PFNs.

Page Table Walking

An embodiment of Page Table Walking for x86 based hardware is:

1. Determine the value of the control register for virtual addressing (control register) in the VM for the first virtual processor 101. The control register may be an x86 register such as CR3. A skilled person would understand that different CPU architectures would have different control register for virtual addressing.

2. Determine the base of the page table structure from where the control register points to, e.g. CR3. For most commodity guest OSs, the region of virtual memory occupied by the OS kernel is present in all page tables in the system, and the regions of memory deemed as critical are subsets of the region of virtual memory occupied by the OS kernel.

3. Starting from the GFN pointed to by the control register, e.g. CR3, walk the guest page table in the manner of a hardware walker e.g. x86, until reaching the translation for a given VA, that is, the GFN the VA maps to.

4. The walk is commonly referred to as a depth-first walk of a radix tree. Each level of the page table is an array with N page table entries (PTEs). Each PTE may point to a children array one level beneath. For example, in an x86 64 bit OS, the page table is comprised of 4 levels, and in each level the array of PTEs points to up to 512 child arrays in the level beneath. Each array of PTEs is fully comprised within a single GFN, and each PTE points to a child array simply by containing the GFN that hosts the child array. At the last level, the PTEs point to so-called leaf GFNs, which are the actual GFNs backing VAs. For each level, a portion of the VA is looked at. For example, at the top level the top 9 bits are looked at, resulting in an index from 0 to 511. This index is used to identify the relevant PTE, and the GFN containing the array of PTEs for the next level. By recursively interpreting in each level the relevant portion of the VA and values of the PTEs, to extract the GFN for the next level, one emulates the process of hardware page table walking, and can ultimately fulfill a VA to GFN translation.

5. Repeat the above process for all distinct virtual memory pages included in the regions of virtual memory deemed critical 106. A skilled person would understand that virtual memory deemed critical could include, but is not limited to, memory required to operate the guest OS. In this example embodiment, examples of this memory can include, but is not limited to, the PFN database and/or the non-paged pool 6. Ignore the virtual memory addresses for which a translation is not available (for example, a PTE in any level of the corresponding walk is an empty entry).

7. Construct a list containing all the GFNs obtained from the virtual memory addresses that had valid translations.

8. If required, supply the list from Step 7 of Page Table Walking to Step 8 in the Creation of a Snapshot method, as discussed below.

Inspection of PFN Database

Generally, in commodity operating systems, state information is kept in internal data structures used by the operating system to manage memory, whether it is virtual address, physical addresses, or physical frame numbers. A skilled person would understand that these operating systems were designed to manage memory on physical machines whereas now they run on virtual machines, or cloned virtual machines. A common data structure found in commodity guest OSs such as Linux/Unix and Windows is the PFN database.

In an embodiment, one of the ranges of virtual memory addresses deemed critical is known to host the PFN database 102. After Step 7. of the Page Table Walking, as described above, the list of PFNs hosting the PFN database is known, and the contents of the PFN database may be inspected 103.

Depending on the support available for the guest OS, the PFN database can be scanned to inspect for flags associated to each PFN of the VM 102. For example, two flags indicate whether a page is "free" or unused, or whether the page is made up of all zeroes. In an embodiment, the page free flag and zero page flag are used.

A skilled person would understand that an entry in the PFN database may contain any and all of the following information, or lists, about a PFN:

1. Whether the frame is dirty or not:
    1. modified or modified list
1. What the frame is being used for:
    1. zero or zero list
    2. free or free list
    3. standby or standby list
    4. active or active list
    5. file cache
    6. text
    7. code
    8. kernel data In an embodiment, the process of inspecting the PFN database can be repeated periodically after clone creation, with an interval between scans regulated by a tunable parameter. The page frame database is extracted or refreshed prior to fetching memory for the VM, or removing memory from the VM footprint. This helps to ensure that the decision to fetch or remove a page of memory is made based on the most current information from PFN database.

A skilled person would understand that it may not be required to pause 105 and unpause 109 the VM when inspecting the PFN database. Although, pausing the VM effectively freezes the PFN database in an unchanging state for the duration of the paused period. However, to maintain consistency of data and to avoid unintended consequences of having the guest OS potentially modifying the PFN database concurrently, in an embodiment, the guest VM is paused when inspecting the PFN database.

Introspection of Special Regions

With knowledge of the identity of the guest OS or kernel it is possible to know the VA ranges for different regions in the VA space 106. These known VA regions or ranges of VAs are used for certain purposes. For example, some of the VA regions are in the kernel space, and some of the regions are in the user space. Some regions of interest are as follows:

1. Kernel space regions
    1. non-paged pool
    2. modules or drivers
    3. paged pool
    4. kernel code
1. User space regions
    1. stack
    2. binary
    3. heap or data Pages in the non-paged pool contain page table pages, driver pages, hardware tables, and other pages with important contents to the functioning of the kernel/guest OS. These pages can similarly be inspected 110. Generally these non-paged pool stay resident in the physical memory of the server to ensure proper operation of the guest VM. However, one or more of these pages could potentially be mapped to one or more GFNs, i.e., these pages might all share a physical memory page, as will be discussed.

Further Optimizations to Memory Oversubscription

In an embodiment, Virtual Memory Streaming can use memory inspection techniques such as introspection to identify portions of memory on the VM that host data structures of critical importance to the guest OS, e.g. page tables. In another embodiment, Virtual Memory Streaming may pre-load these portions of memory and never remove them from the memory footprint of the guest OS of the VM in order to ensure the correct execution of the guest OS.

In an embodiment, Virtual Memory Streaming uses introspection on the VM to identify pages of memory that include, for example, pages that contain all zeroes, or are labeled as "free" by the guest OS, and to remove such pages from the memory footprint of the VM.

In an embodiment, Virtual Memory Streaming uses information provided by the virtualization hardware to track accesses to memory by the VM. Then, portions of memory that have not been utilized recently are selected. Then, those selected under utilized portions of memory are removed from the footprint of the VM.

In another embodiment, multiple optimizations may be used together to maintain the memory footprint of the VM to an arbitrarily chosen target for improving the memory oversubscription capacity of the host server.

Implicit Storage and Identification of Unused or Free VM Memory Pages

In an embodiment, during memory pressure on the physical host or the host server, the memory footprint of each individual VM can be reduced by removing memory pages that are not being used by the guest OS based on information inferred from the PFN database. In an embodiment, introspection identifies pages of memory that include, for example, pages that contain all zeroes or are labeled as "free" by the guest OS. These pages are then removed, or deallocated, from the memory footprint of the VM.

In an embodiment, freeing pages is transparent to the operating system running on the VM because there is no change to the virtual address space to physical address space mapping. If the deallocated memory is later required, it can be re-allocated and initialized or paged back in on-demand by the host server or VMM.

In an embodiment, when a guest page is identified as unused by the mechanism above, no secondary storage is required to retain the contents of the removed page. This is because, through introspection, it is known that this page has not yet been used by the guest virtual machine. This is achieved by sharing the page with a known zero page. Thus, when the page is required by the VM, a new zero page is allocated in a copy-on-write fashion.

A skilled person would understand that alternate ways of freeing pages may be used without departing from the scope of this disclosure. For example, in another embodiment, it is recorded in a table that the page was unused. When the VM attempts to access the deallocated page, a new frame is allocated, cleared, and mapped into the VM's virtual RAM. This allows for practically zero-cost memory reclamation without the need to inspect any memory contents directly since the memory page's unused status is inferred directly from the metadata.

Tracking of Memory Accesses

In an embodiment, Virtual Memory Streaming uses information provided by the virtualization hardware to track accesses to memory or memory pages by the VM. Then portions of memory that have not been utilized recently are selected, and those selected portions of memory are removed from the memory footprint of the VM. In another embodiment, these lightly used memory pages can be written, or "paged", to secondary storage.

In an embodiment, in order to inform memory management decisions, information about guest VM memory page usage is passively collected by trapping read, write and execute accesses to guest memory pages at varying intervals.

This is accomplished in an efficient way either by using a shadow page table mechanism, wherein separate memory management structures are created to safely mirror the guest VM's structures, or by using hardware virtualization support, e.g. Intel's EPT extensions or AMD's NPT extensions, to trap accesses to specific GFNs. Notification of these accesses are recorded asynchronously and used to inform memory management decisions while the guest continues to execute.

Generally, memory pages that have not been accessed recently are favoured over memory pages that are used frequently for the purposes of reducing memory. In an embodiment, the contents of these lightly accessed pages can be written, or "paged", to secondary storage. Paging is a standard mechanism in Operating Systems and virtualization. Paging is required to support cases where the other mechanisms fail to reclaim sufficient memory and additional physical memory is required.

On-Demand Provisioning of VM Memory

During operation, the guest VM may attempt to access a GFN that has not yet been allocated to physical host memory or has not yet been loaded from a state file. This scenario can occur when a lightly accessed GFN has been paged out, a "free" page has been deallocated, or after the cloning process has completed (as will be described later). When such an access to an uninitialized GFN occurs, an embodiment may:

1. Pause the virtual CPU of the VM;
2. Allocate a page of memory to hold the GFN's contents;
3. Load the GFN's contents from the snapshot file into the newly allocated page;
4. Direct the VM management system to place the newly allocated page into the VM's virtual RAM at the appropriate location; and
5. Unpause the virtual CPU of the VM.

A skilled person would understand that alternative methods of provisioning VM memory may be used, and that the alternative methods may depend on implementation specifics of the VM management system used by the host. For example, in another embodiment, the virtual CPU of the VM may not need to be paused in order to provision the memory page.

In an embodiment, the contents and metadata of a GFN can be stored in any generic data store such as a local or remote database, a file, an object store, or a network file store (NFS). In an embodiment, the memory region's contents can be stored in a file. A skilled person would understand that storing data could be performed in any number of ways including, but not limited to, a database, an object store, a networked file system, or a local file.

In an embodiment, storing the contents in a file may have benefits over serving the contents from a server. This is because the server could potentially become a bottleneck or a point of failure. Furthermore, there are known enterprise high-availability file systems that may be used to make the file available over a network. As an example, in an embodiment, the contents of a lightly accessed memory page and its corresponding metadata may be stored in one or more files stored in a file store. These files are then used to reallocate the GFN and its contents when the guest OS on the VM attempts to access the previously deallocated GFN.

Sharing Common Pages

In an embodiment, in the context of cloning, at the time of launch of a clone VM, Virtual Memory Streaming may only load the minimum set of GFNs into physical memory for the virtual machine to operate in its given state or initial state. In this scenario, when the virtual machine makes a request for an unallocated GFN, Virtual Memory Streaming will reallocate the contents of the GFN as described above. Thus, upon creation, the VM does not have to have all of its memory allocated. And, the VM is able to fetch the memory contents of the snapshot on demand, as required, rather than at the point of re-creating the cloned VM.

In another embodiment, Virtual Memory Streaming provides functionality that allows for the sharing of a single PFN by several running guest virtual machines. That is, a PFN maps to multiple GFNs, that is, one from each guest virtual machine. This scenario is most common in situations where one or more guest virtual machines are cloned from a single snapshot. Although, a skilled person would understand that alternate scenarios may be contemplated where a PFN could be shared amongst one or more guest virtual machines. An example of such a scenario is where two guest virtual machines running the same OS may have exactly the same contents in the same GFN even though they are not clones of the same snapshot.

If one of the VMs requests to write to this GFN, then a copy-on-write operation is performed, so that the VM may modify memory without affecting the other VM.

It should be noted that the contents of memory of VMs are not scanned when looking for matching GFNs. That is, the system does not scan the contents of a first and second VM's memory to determine whether the same numbered GFN in each guest virtual machine contains exactly the same information.

Sharing of State Between Cloned Virtual Machines

In an embodiment, one or more memory pages can be shared amongst several cloned VMs. This is because cloned VMs all have the same initial state. Thus, when a page is accessed for the first time by the cloned VM, instead of fetching the associated contents from a file or over the network, the corresponding GFN can immediately be shared with the same GFN from any other cloned VM from the same originating snapshot, provided that the other clone VM has not yet written to the given GFN. These GFNs must be marked in a special way such that when they are written to, prior to the modification, new pages with the same contents will be allocated by the hypervisor, and GFN to PFN mappings changed to private copies, i.e. copy-on-write.

In another embodiment, all available shared memory pages can be mapped in the clone VM when the cloned VM is initially created, as additional references to the shared frames do not increase memory usage. This reduces the fault time associated with the first time a VM accesses a given memory page, thus improving performance.

In another embodiment, this can be further augmented by preloading the entire contents of the memory state into a non-executing VM, i.e. all memory pages in the snapshot. Thus, each cloned VM can immediately be populated with the entire memory state and proceed in a copy-on-write fashion.

In an embodiment, the identification of shareable pages is implicit based on the clone parent or snapshot and GFN. No examination or comparison of the memory page contents is required. For example, hashing of page contents or other "fingerprinting" mechanisms are not required.

Cloning

In an embodiment, Virtual Memory Streaming may be used to manage the memory of cloned virtual machines. In another embodiment, Virtual Memory Streaming may create a snapshot of a running virtual machine, examine the memory footprint of the VM snapshot for opportunities to conserve memory on the host machine, launch cloned virtual machines based on the snapshot, and to implement these memory savings in virtual machines cloned from the VM snapshot.

Cloning Virtual Machines, Memory Streaming, and Memory Oversubscription

In an embodiment, to clone a VM, an originating VM and snapshot is required. The snapshot is prepared from an originating VM that contains the guest OS and application programs that are to be cloned. The guest OS and application programs may vary depending on the use of the cloned VM. A skilled person would understand that VDI and cloud infrastructure would use cloned VMs for different purposes. For instance, a VDI cloned VM might be used to provide word processing applications to a human user. A cloud infrastructure cloned VM, in another example, might be used to process web traffic during a period of high traffic. Virtual Memory Streaming then creates a clone VM which is a copy of the originating VM.

In an embodiment, the cloning operation is generalized for cloned VMs running on a single server or a network of servers, and where the snapshot may be stored in a file or other known computer data storage or memory. In another embodiment, cloning may build upon and generalize the systems and methods for migrating the clone VM to a different physical computer host and providing memory across a network of virtual machines. An example of such a system is described in U.S. patent application Ser. No. 12/942,045, "Managing Memory Across A Network of Virtual Machines" by Adin Scannell et al., which is incorporated in its entirety by way of reference.

In an embodiment, Virtual Memory Streaming is able to defer the allocation of a portion of memory required by a cloned virtual machine and only needs to allocate a subset of memory to the physical memory of the server on which the cloned virtual machine runs. Upon execution of the cloned virtual machine, any required memory contents for continued execution of the cloned virtual machine that were not allocated to the server's physical memory can be dynamically allocated and the contents of the memory fetched through on-demand provisioning of VM memory. On-demand provisioning of VM memory was described above.

In an embodiment, it follows that if the clone VMs are cloned from the same snapshot, at least initially the memory footprints of all cloned VMs are identical. This homogeneity in VM clusters means that the initial identical memory footprints may be used advantageously. The advantage is that the clone VMs may use less physical memory of the server than they notionally require since only an initial subset of the memory required by each clone VM is allocated, and the allocated memory may be shared, therefore there may be an increase in the efficiency of physical memory usage of the server, i.e. memory oversubscription.

In an embodiment, during the course of execution, the clone VM will access most of its memory footprint and therefore cause substantial amounts of physical RAM to be allocated. As was discussed above, different embodiments of Virtual Memory Streaming functionality may be used together to reduce the overall RAM footprint of a clone VM or group of cloned VMs, and also to reclaim any allocated memory that is not being actively used by the cloned VM or VMs. The combination of using these embodiments with an embodiment of on-demand memory allocation or provisioning allows a group of cloned VMs to run in substantially less physical memory, or to oversubscribe memory.

Creation of A Snapshot

A VM snapshot is a data structure comprising information about an executing VM, in a specific state or point in time or both, such that the snapshot may be used to recreate the running VM either at another point in time, on another physical machine, or both. A snapshot generally contains:
 1. The registers and other state of the virtual CPU(s)
 2. The contents of each locally attached virtual storage device
 3. The contents of Random Access Memory
 4. The state of any attached virtual devices, such as, a virtual Video Graphics Adapter (VGA), virtual network devices, virtual USB devices, etc.

A skilled person would know that generally the method for creating a snapshot is to:
 1. Pause or suspend the Virtual Machine.
 2. Create a replica file.
 3. Write VM properties to the file, such as the number of virtual CPUs and the amount of RAM.
 4. Write CPU(s) state(s) to the replica file.
 5. Write the contents of memory to the replica file.
 6. Write state information of any attached virtual devices to the replica file.

It is also understood that the state of virtual storage devices, e.g. virtual hard drives, are separately "snapshotted", and some link between the snapshot and the storage snapshot is established so that when a VM is resumed from the snapshot the VM management system is able to select the appropriate storage snapshot.

In an embodiment, the snapshot further comprises a list of memory regions that must be present before a clone of the VM begins executing, either for performance or correctness. These memory regions span internal operating system data structures such as memory page lists and page tables. These memory regions may be identified or discovered by introspection of the VM's memory, and by interpreting the internal operating system data structures.

In an embodiment, creating a snapshot requires the addition of two additional steps:
 7. Detect memory regions that require "pre-loading".
 8. Write a list of the locations of these regions to the snapshot file.

In another embodiment, Step 8 is carried out using the information contained in the page table data structure, which reflects translations between virtual addresses and PFNs. This was described above in Page Table Walking.

Creation of Clone Virtual Machine from the Snapshot

Once a snapshot is obtained, virtual machines based on the snapshot, known as "clones" or state replicas, may be launched. A skilled person would understand that how a clone is launched will depend on factors such as the virtual machine manager used or the host environment. For instance, in general the process known in the prior art for "resuming" a cloned VM after cloning from a snapshot is to:
 1. Load static initialization data from the replica file.
 2. Allocate data structures for the virtual CPU(s).
 3. Allocate memory for the VM's RAM.
 4. Load the virtual CPU state(s) from the replica and initialize the VM's virtual CPU(s).
 5. Load the contents of memory from the replica and initialize the VM's RAM.
 6. Load in virtual device state from the replica and initialize virtual devices.
 7. Attach virtual storage.

At the end of this process known in the prior art, the cloned VM is ready to begin executing as if it were a normally booted VM. During the creation or resuming of the clone VM, at step 3 of the known process, all the memory required for the cloned VM is allocated.

Now, in an embodiment of the method provided herein, where the different steps of resuming a cloned VM comprise:
1. Load static initialization data from the snapshot file.
2. Allocate data structures for the virtual CPU(s).
3. Load the virtual CPU state(s) from the snapshot file and initialize the VM's virtual CPU(s).
4. Load the list of special memory regions from the replica file.
5. For each location in the list:
    1. Allocate pages of memory to hold the region's contents.
    2. Load the region's contents from the replica file into the newly allocated pages.
    3. Direct the VM management system to place the newly allocated page into the VM's virtual RAM at the appropriate location.
6. Load in virtual device state from the replica and initialize virtual devices.
7. Attach virtual storage.

In an embodiment, an advantage of creating or resuming a clone is that not all the memory required for the cloned VM's RAM needs to be allocated when the VM is resumed. Above Steps 2-5 only allocate a subset of the required data structures and special memory regions of the cloned VM's RAM. This subset of memory is a tunable parameter and can be optimized for various outcomes. For example, in another embodiment, the parameter may be tuned so as to provide for a minimal operational subset of memory so as to maximize memory oversubscription.

Identifying and Identifiers of Operating System Running on Virtual Machine

In an embodiment, cloning VMs may result in CPU and disk input/output overhead improvements. In an embodiment, if the snapshot is created from an originating VM that has already booted then the cloned VM does not require booting, which means that the most disk I/O intensive phase of execution may be skipped. In VDI and cloud infrastructure deployments, the network and/or disk input/output (I/O) usage during this phase is often a critical bottleneck, and is known as the "bootstorm" problem.

However, creating a clone VM from a snapshot which has already booted raises issues such as network identification conflicts or domain authentication problems. For example, the guest OS in the snapshot may contain identifiers that need to be changed between different individual clone VMs to prevent problems such as network identity conflicts. Changing these identifiers typically requires that the guest OS running in the clone VM is rebooted for the changes to take effect.

Rebooting the guest OS after identifiers are changed, however, would not overcome the "bootstorm" problem. In an embodiment, the identifiers in the guest OS may be altered or changed in a manner that does not require the guest OS to be rebooted. In another embodiment, when the guest OS running on the clone VM is known, OS specific identifiers may be changed without requiring a reboot of the VM, thereby avoiding the "bootstorm" problem.

Introspection of Operating System Running on a Virtual Machine

Generally, operating system state information is kept in internal data structures used by the operating system to manage memory, whether it is virtual address or physical addresses or physical frame numbers. Technically, this means that the virtual addresses used by the operating system, how the virtual addresses are mapped through the page tables to the physical addresses, and the data structures maintained by the OS at those physical addresses can all be examined via introspection. This is because even though these operating systems were designed to manage memory on physical machines, now that they run on virtual machines their memory can be managed by Virtual Memory Streaming. That is, memory state information can be extracted from the operating system by examining the memory or kernel or both of the guest OS running on the clone VM.

In an embodiment, introspection may be used to scan the memory of a VM in order to identify and track specific values stored in memory. This may be used, for example, in altering the identity of a MICROSOFT WINDOWS based cloned virtual machine. The ability to alter the identity of a live virtual machine during cloning may allow the virtual machine to operate and authenticate on a network without identity or authentication conflicts. These conflicts generally occur because the identifiers are the same for the clone VM and the snapshot or source VM. The conflicts are avoided without the need to go through the entire MICROSOFT WINDOWS reconfiguration process or rebooting of the OS running on the VM before running the VM.

Alternatively, in another embodiment, the memory of a virtual machine snapshot can be examined without introspection in order to identify sentinel values. For example, the memory of a virtual machine snapshot can be examined when it is a non-running state and stored in a file store. In this embodiment, the descriptor and memory files that make up part of the snapshot can be examined directly and without the need to use introspection to access the memory of a running virtual machine.

Identifying Guest Operating System Running on Virtual Machine

Known virtual machines and hypervisor software do not care what type of guest OS is executing because the guest OS is generally treated as a black box. However, in an embodiment, the guest OS and its kernel contain information or metadata about the physical frames that can be used to allow for memory oversubscription on cloned virtual machines, as well as to identify the guest OS running on a VM. When the guest OS has been identified, information from the kernel of the guest OS can be extracted. Examples of such information include, but are not limited to, the PFN database and PFN special regions.

Figure 2:
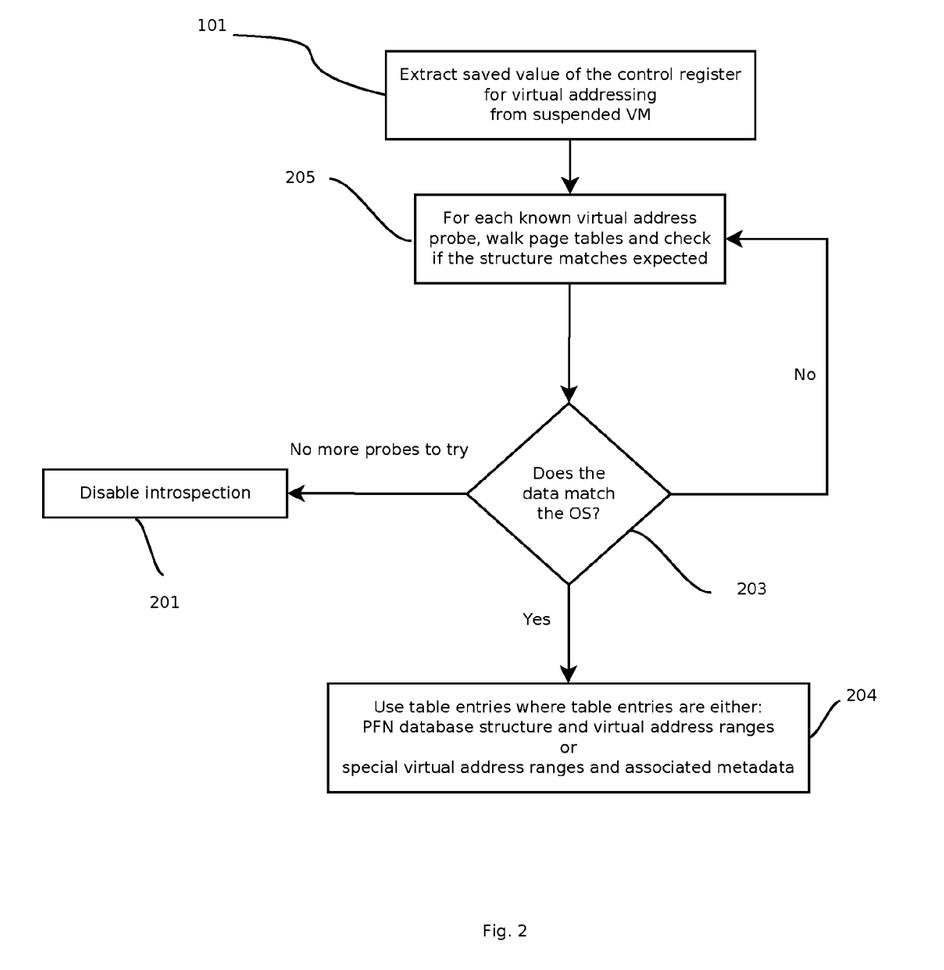
FIG. 2 is a block diagram of an embodiment of a procedure for detecting the guest operating system running on a virtual machine.

FIG. 2 describes an embodiment of the workflow for detecting the identity of the guest OS. It begins by extracting the value of the control register for virtual addressing 101, e.g. CR3 for x86. The value of the control register for virtual addressing is used to walk the page tables 205 in order to extract the PFNs hosting the locations of OS data structures used to uniquely identify the OS. This is another embodiment of Page Table Walking. For each supported OS, the relevant symbols are scanned in order to find a match 203.

If no match is found, the next symbol or "probe" is tried. If a match is found, then Page Table Walking is used again to introspect the PFN database and to introspect the special regions 204, as was described above. As was described above, while the PFN database and special regions are introspected a collection of metadata can also be amassed. This metadata allows the grouping of PFNs into subsets, such as but not limited to:
1. the set of PFNs that are all zeroes;
2. the set of PFNs that are currently unused by the guest OS;
3. the set of PFNs that host page table pages;
4. the set of PFNs that are part of the non-paged pool;
5. etc.

Alternately, if there are no more probes to try, then introspection ends 201. Regular VM execution can then resume.

Altering Identity of Guest Operating System Running on Virtual Machine

A problem arises when attempting to incorporate cloned VMs into networked environments such as VDI or cloud computing infrastructure when:

1. The networking system uses a machine identifier of the VM as an authentication key;
2. The operating system instance within the VM does not allow modification of necessary machine identifiers while the VM is running, i.e. without a reboot; or
3. The networking system requires that each machine on the network has unique machine identifiers.

In some cases this is due to the identifier being loaded from storage only once by the OS, at boot time, and thereafter immutably kept resident in memory.

In some cases the machine identifier is used as an authentication key in modern networking systems, e.g. systems where networks of computers use or provide services such as file servers, e-mail services, and printing services. In particular, the machine identifier in MICROSOFT WINDOWS OS variants is used as an account key in MICROSOFT ACTIVE DIRECTORY network management, authentication, and access control systems. Thus, when an instance of a MICROSOFT WINDOWS operating system is requesting access to a MICROSOFT ACTIVE DIRECTORY network resource, it uses its machine identifier as an authentication key.

The problem stems from the fact that the cloned VMs are exact replicas of an original VM, that is, they make use of the original VM's machine identifiers. Therefore, the cloned VMs or replicas will all appear to be claiming to be the same machine to other machines on the network. In some applications, such as the MICROSOFT ACTIVE DIRECTORY environment, described above, launching a cloned VM with the same network identifier might lead to network authentication and operability issues. Thus, a mechanism or solution for altering the identities of these cloned VMs is required in order for them to interoperate within a networking system that accounts for the three constraints described above.

In an embodiment, there is provided the functionality to alter the identities of the cloned virtual machines before or during the creation of the clone VMs. In an embodiment, the original VM is identified using a sentinel value that can be found using memory scanning techniques such as introspection. These sentinel values are then replaced by unique identifiers that allow the cloned VM to operate without conflicting with other cloned VMs or VMs on the network.

Uncooperative Transparent Machine Identifier Change

In an embodiment, first, the original VM is given a valid machine identifier with a high degree of entropy, e.g. a string with a known prefix and a randomly generated suffix of alphanumeric characters of a known and sufficiently long length. The length is considered to be sufficiently long when the probability of the randomly generated string occurring within the contents of a VM's memory outside of the context of the machine identifier is sufficiently small. For example, if upper- and lower-case letters and the numerals between 0 and 9 are used as an alphabet to generate the random string and the string length is 15 characters long, there are 15 to the 62nd power different possible random strings, i.e. more than 10 to the 72nd power. While not all 15 character strings have an equal probability of occurring within the contents of a VM's memory—for example, the string containing 15 null characters, i.e. zero-bytes, occurs far more frequently than the average 15 character string, a length of 15 could be considered sufficiently long. This randomly generated human-readable identifier is termed the sentinel or sentinel value.

Then, in an embodiment, when the original VM is suspended and the snapshot created, the contents of the VM memory component of the snapshot is scanned for occurrences of the exact sentinel as well as optional variations on the sentinel, for example:

1. Occurrences of the sentinel where all alphabetical characters have been converted to upper-case.
2. Occurrences of the sentinel where all alphabetical characters have been converted to lower-case.
3. Occurrences of the sentinel where the sentinel has been converted to a different character encoding, e.g. Unicode UTF-16.
4. Occurrences of the upper- and lower-case variations of the sentinel have been converted to a different character encoding.

In an embodiment, locations in the VM's memory component where the sentinel or variations of it have occurred are termed matches and are noted in a table. The type of match, i.e. whether it is a match of the exact sentinel or some variation of the sentinel, may also be recorded in the table. Also, if multiple types of matches are found, each type of match found may be listed in the table. Also, the locations where matches are found may be grouped into regions of a certain size, e.g. the size of a memory page on the underlying computer architecture, in order to reduce the size of the table.

In an embodiment, prior to the creation of each clone VM, the clone VM is assigned a machine identifier, for example by a human operator or by a computer system. A computer system, e.g. XEN DESKTOP, may assign or generate identifiers for clone VMs before the creation or resuming of a clone VM. This new identifier is termed the replacement.

In an embodiment, as the VM memory contents are loaded from the snapshot during the process of creating a clone VM, each memory location loaded is checked against the table of matches. If the table contains indicators for multiple types of match, the memory location is scanned for each type of match that is indicated in the table; else, the memory location is scanned for all types of matches. In each location where the scan results in a positive match for a variant of the sentinel, the match is replaced in-place with the corresponding variant of the replacement. For example, if the sentinel was an all-upper-case variant of the sentinel, it is replaced with an all-upper-case variant of the replacement. If the locations where matches were found were grouped into regions of a certain size, the entire region is scanned for the sentinel or its variants as determined by the match information available in the table.

In another embodiment, optionally, additional sentinel values can be provided that were not available during the initial table construction. In this case, all memory locations are scanned for the presence of these sentinel values when the VM first accesses them. Once these sentinel values have been replaced with their new counterparts, the process for bringing up the virtual machine can continue. Then, the cloned virtual machine will operate as a machine on the network having its own unique identifier.

Domain Authentication and Network Services

In some applications, some keys and values in the VM are derived from the machine identifier. For example, in a MICROSOFT WINDOWS environment, interacting with a MICROSOFT ACTIVE DIRECTORY account and authentication management system, the MICROSOFT ACTIVE DIRECTORY domain controller may issue a Domain Secure Identifier (SID), i.e. the unique identifier associated to an object in MICROSOFT ACTIVE DIRECTORY, which is associated with the specific machine identifier of the machine. This domain SID is cached on the VM and may present difficulties for authenticating cloned VMs.

For clone VMs where the guest OS are specific versions of MICROSOFT WINDOWS, the problem is that if the hostname or machine identifier for a VM is not changed when it is cloned, the cloned VM will have the same Domain SID as the original VM. This will cause problems for any interactions with the domain controller. However, if the hostname is changed for the cloned VM, the cloned VM may still have the wrong Domain SID cached. This would cause authentication errors with the domain controller.

Figure 3:
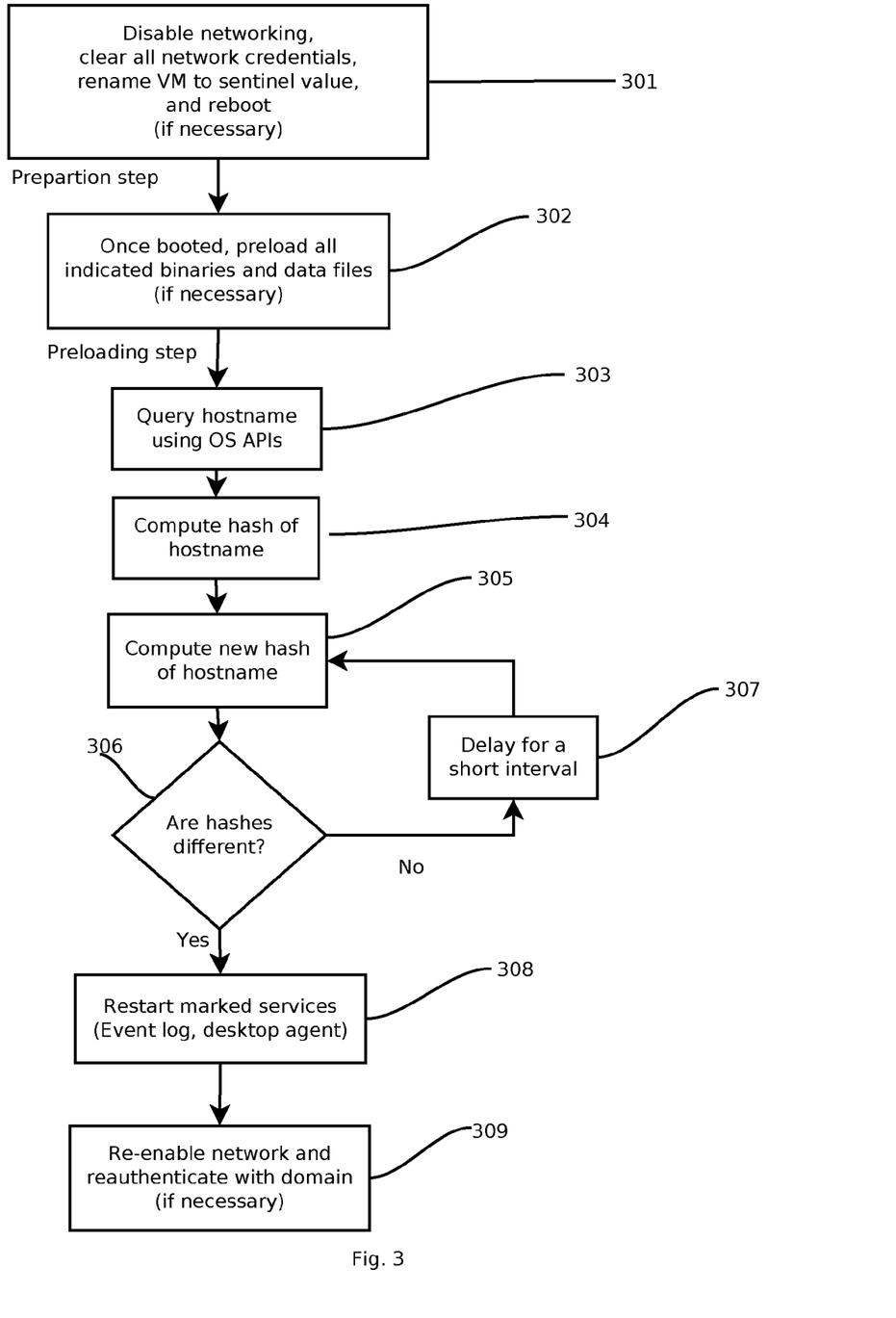
FIG. 3 is a block diagram of an embodiment of a procedure for the guest agent running on the guest operating system for assisting in the changing of the identifiers of the guest operating system.

In an embodiment, in order to handle these border cases, an agent is installed in the VMs in the form of a persistent process, generally known as a service or a daemon. This agent is a user-space process and requires kernel-level access in the guest VM. The workflow of the agent operating in the guest VM is depicted in FIG. 3.

In an embodiment, the agent is also responsible for computing the sentinel value and programmatically changing the machine identifier. In another embodiment, the agent may reboot the VM after changing the machine identifier. This reboot is acceptable if it occurs prior to creation of the live snapshot that will serve as the basis for cloned VMs.

In an embodiment, if the VM is running on an OS with some form of centralized authentication, e.g. MICROSOFT ACTIVE DIRECTORY domains, the network is disabled 301 prior to the above reboot. This prevents the authentication controller from seeing the VM with the original sentinel value machine identifier. Furthermore, existing cached authentication tokens and keys are programmatically cleared, forcing the guest VM to re-authenticate cleanly once the network is enabled.

In an embodiment, optionally, the agent will load a collection of binaries and data files into memory when the VM is booted prior to the creation of the replica file 302. This step ensures that created cloned VMs are in a useful state. For example, in a VDI environment, one might preload all of Microsoft Office.

In an embodiment, then, the agent enters a mode to detect replication. The user or administrator would go through the process of creating a replica file for this VM. This snapshot is then used to launch cloned VMs using the process described above.

In an embodiment, when a cloned VM is launched based on the snapshot taken above, the agent will need to determine whether it is a clone, i.e., that it has been replicated, and take steps to allow for the clone to authenticate on the network. In order to detect replication, the agent relies on the changing sentinel value. An embodiment for detecting whether a replication has occurred is provided below, though a skilled person would understand that alternate ways of detecting replication could be used without departing from the scope of this disclosure.

In an embodiment, first, the user agent queries the operating system for the machine identifier or computes the sentinel internally 303. Next, it computes a hash value for the sentinel 304. Then, the agent re-queries the operating system for the machine identifier or re-computes the sentinel internally. A new hash value of the new sentinel is computed 305. If this value is different 306 from the previously computed hash value, then a clone operation has been detected. Otherwise, the agent is delayed 307 for a small time period before repeating the query step. If the machine identifier has been changed, then the computed hash values will also change. The user agent uses this change to determine whether the VM is a clone.

In an embodiment, it is assumed that each cloned VM will be assigned a unique hostname or machine identifier. This can occur either before the VM is resumed or before the VM is cloned. The unique hostname can come from known software used to manage the cloned VMs (e.g. XEN DESKTOP). A skilled person would understand that other ways of assigning unique hostnames could be used without departing from the scope of this disclosure. For instance, a human operator may assign a unique hostname for each cloned VM.

In an embodiment, once the agent detects the change, the agent then restarts services that derive keys or values from the machine identifier 308. For example, in the case of VDI, the desktop agent is restarted. For a cloud network server, the agent may manually restart database connections. A skilled person would understand that any services or programs that depend on host identifiers to operate would need to be restarted so that the change will take effect.

In an embodiment, then, the network is enabled 309 for the VM if it was initially disabled. This will allow the VM to authenticate for the first time with any authentication controller or network services. For instance, in this example embodiment the VM will be able to obtain new credentials such as a DOMAIN SID.

In an embodiment, additional post-clone operations can optionally be specified by the user by using a configuration file. For example, such actions may include restarting specific services or registering with network servers.

An embodiment of restarting specific services or registering with network servers comprises:
1. Hostname_1=get_hostname( );
2. Hash_1=compute_hash(Hostname_1);
3. do {
    1. Hostname_2=get_hostname( )
    2. Hash_2=compute_hash(Hostname_2);
4. } while (Hash_1==Hash_2);
5. then hostname has changed, restart domain authentication and network services An embodiment of preparing a VM for cloning comprises:
1. Disable network;
2. Calculate sentinel hostname with reboot, generated by hashing MACS—know it is the same inside guest VM (MAC) and outside (MAC);
3. Use operating system, e.g. MICROSOFT WINDOWS, internal API to clear any cached domain credentials;
4. Rename host name to sentinel hostname;
5. Reboot;
6. Start hostname change agent, which has to be installed on VM before;
7. Save VM.

Where, the VM is saved without credentials, and network is disabled in order to prevent the guest OS from automatically obtaining new credentials.

When a clone VM, generated using the steps above, is launched by the VMM, the sentinel hostname is changed to a new hostname on the fly as the clone is launching. Once the sentinel hostname values are changed to the new hostname, the agent brings up the network.

It is obvious that the foregoing embodiments of the invention are examples and can be varied in many ways. Such present or future variations are not to be regarded as a departure from the scope of the invention, and all such modifications as would be obvious to one skilled in the art are intended to be included within the scope of the following claims.

What is claimed is:

1. A method for oversubscribing a host memory of a host running a virtual machine monitor (VMM), comprising:
examining a virtual machine (VM) memory for the VM for metadata associated with the VM memory, the metadata including information from a physical frame number (PFN) database extracted from a kernel of the guest OS, the PFN database maintaining state information for each PFN the guest OS the VM knows about;
collecting the metadata for the VM memory; and
managing the VM memory using the metadata for oversubscribing a host memory.

2. The method of claim 1, wherein the step of managing comprises:
selecting a portion of the VM memory for removal based on the metadata for the portion of the VM memory; and
removing the portion of the VM memory from the VM.

3. The method of claim 1, wherein the step of managing comprises:
selecting one or more memory pages of the VM memory for removal based on the metadata for the one or more memory pages; and
removing the selected memory pages from the VM.

4. The method of claim 3, wherein the selecting for removal is based on the metadata indicating the memory page is free or zero.

5. The method of claim 2, wherein the memory where the metadata is non-pageable is not selected for removal.

6. The method of claim 1, wherein the metadata for the memory is one of: free, zero, or non-pageable.

7. The method of claim 6, wherein the step of collecting comprises:
inspecting the physical frame number (PFN) database for the free or zero metadata for the memory.

8. The method of claim 5, wherein the step of collecting comprises:
searching kernel virtual address ranges for the memory with the non-pageable metadata.

9. The method of claim 7, wherein the step of collecting further comprises:
searching kernel virtual address ranges for the memory with the non-pageable metadata.

10. The method of claim 1, wherein the steps are performed by the virtual machine monitor (VMM).

11. The method of claim 1, wherein the memory, the VM, and the guest OS are manipulated without the intervention by the guest OS.

12. A method for managing a host memory of a host by a virtual machine monitor (VMM), comprising:
introspecting a physical frame number (PFN) database of a virtual machine (VM) memory for a VM for metadata associated with the VM memory, the metadata maintained by a guest OS running on the VM, the metadata indicating whether a given frame is used and whether the given frame belongs to special regions that should not be removed or unmapped; and
oversubscribing the host memory by using the metadata.

13. The method of claim 12, wherein the step of oversubscribing comprises:
selecting a portion of the VM memory for removal based on the metadata for the portion of the VM memory;
removing the portion of the VM memory from the VM.

14. The method of claim 13, wherein the selecting for removal is based on the metadata indicating the memory is free or zero.

15. The method of claim 13, wherein the memory that belongs to non-pageable kernel virtual address regions is not selected for removal.

16. The method of claim 12, wherein the metadata for the memory or the memory page is one of: free, zero, or non-pageable.

17. The method of claim 16, wherein the step of introspecting comprises:
inspecting the PFN database for the free or zero metadata for the memory.

18. The method of claim 12, wherein the step of oversubscribing comprises:
selecting one or more memory pages of the VM memory for removal based on the metadata for the one or more memory pages;
removing the selected memory pages from the VM.

19. The method of claim 12, wherein the memory, the VM, and the guest OS are manipulated without the knowledge of the VM and the guest OS.

20. A system for oversubscribing a host memory of a host running a virtual machine monitor (VMM), comprising:
a virtual machine (VM) memory on a VM, the VM running in the host memory;
a metadata database with metadata associated with the VM memory, the metadata maintained by a guest OS, the metadata including information from a physical frame number (PFN) database extracted from a kernel of the guest OS, the PFN database maintaining state information for each PFN the guest OS the VM knows about;
wherein, the VMM manages the VM memory using the metadata for oversubscribing a host memory.

* * * * *